United States Patent
Koa et al.

(10) Patent No.: US 11,936,261 B2
(45) Date of Patent: Mar. 19, 2024

(54) DISTRIBUTED DOUBLE LITZ WIRE WINDING IN OPEN SLOTS

(71) Applicant: Kongsberg Maritime AS, Horten (NO)

(72) Inventors: Jon Ivar Koa, Trondheim (NO); Roar Furuhaug, Trondheim (NO); Stev Erlend Skaar, Trondheim (NO); Njål Rotevatn, Trondheim (NO)

(73) Assignee: Kongsberg Maritime AS, Horten (NO)

( * ) Notice: Subject to any disclaimer, the term of this patent is extended or adjusted under 35 U.S.C. 154(b) by 395 days.

(21) Appl. No.: 17/424,538

(22) PCT Filed: Feb. 6, 2020

(86) PCT No.: PCT/NO2020/050030
§ 371 (c)(1),
(2) Date: Jul. 21, 2021

(87) PCT Pub. No.: WO2020/162763
PCT Pub. Date: Aug. 13, 2020

(65) Prior Publication Data
US 2022/0069652 A1    Mar. 3, 2022

(30) Foreign Application Priority Data
Feb. 6, 2019 (NO) ................................. 20190162

(51) Int. Cl.
*H02K 3/14*    (2006.01)
*H02K 1/16*    (2006.01)
*H02K 3/28*    (2006.01)

(52) U.S. Cl.
CPC .............. *H02K 3/14* (2013.01); *H02K 1/165* (2013.01); *H02K 3/28* (2013.01)

(58) Field of Classification Search
CPC .............. H02K 3/14; H02K 1/165; H02K 3/28
See application file for complete search history.

(56) References Cited

U.S. PATENT DOCUMENTS

| | | | |
|---|---|---|---|
| 5,319,844 A | 6/1994 | Huang et al. | |
| 5,714,824 A * | 2/1998 | Couture | H02K 3/12 310/201 |
| 5,926,940 A * | 7/1999 | Toh | H02K 15/045 29/596 |
| 6,894,417 B2 | 5/2005 | Cai et al. | |

(Continued)

FOREIGN PATENT DOCUMENTS

| | | |
|---|---|---|
| JP | 08182238 A | 7/1996 |
| WO | 9115892 A1 | 10/1991 |

(Continued)

OTHER PUBLICATIONS

International Search Report and Written Opinion dated May 11, 2020 for International Patent Application No. PCT/NO2020/050030.

(Continued)

*Primary Examiner* — Robert W Horn
(74) *Attorney, Agent, or Firm* — Alix, Yale & Ristas, LLP

(57) ABSTRACT

An electric machine comprising a stator with a plurality of open slots accommodating double-layer distributed winding with conductors transposed in the end-winding area. The conductors are litz wire conductors and the end-winding portions of the conductor are not twisted or turned around the axis of the conductor.

16 Claims, 8 Drawing Sheets

(56) References Cited

U.S. PATENT DOCUMENTS

| | | | |
|---|---|---|---|
| 7,227,438 B2 * | 6/2007 | Song | H01F 36/00 336/DIG. 1 |
| 7,265,472 B2 * | 9/2007 | Mitcham | H02K 3/14 310/201 |
| 7,474,030 B2 * | 1/2009 | Mitcham | H02K 3/14 310/208 |
| 7,759,834 B2 | 7/2010 | Onimaru et al. | |
| 8,946,965 B2 | 2/2015 | Chiba et al. | |
| 2010/0253176 A1 | 10/2010 | Ovrebo et al. | |
| 2014/0015348 A1 | 1/2014 | Li | |
| 2022/0069652 A1 * | 3/2022 | Koa | H02K 3/28 |

FOREIGN PATENT DOCUMENTS

| | | | |
|---|---|---|---|
| WO | WO-0239466 A1 * | 5/2002 | H02K 3/14 |
| WO | WO-2007100255 A1 * | 9/2007 | H02K 1/146 |
| WO | 2009000837 A2 | 12/2009 | |
| WO | 2016189192 A1 | 12/2016 | |

OTHER PUBLICATIONS

International Preliminary Report on Patentability dated Mar. 15, 2021 for International Patent Application No. PCT/NO2020/050030.

* cited by examiner

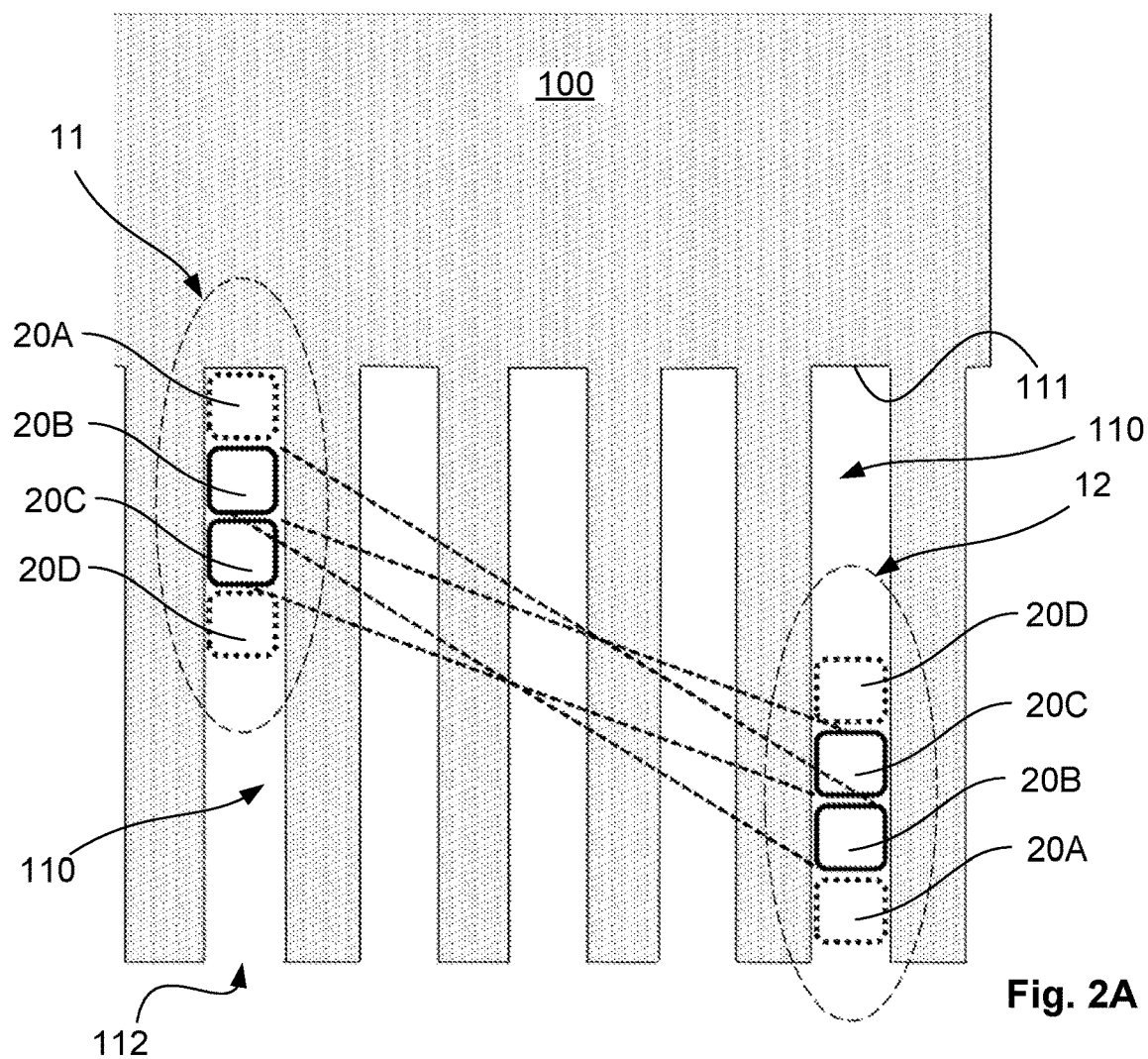
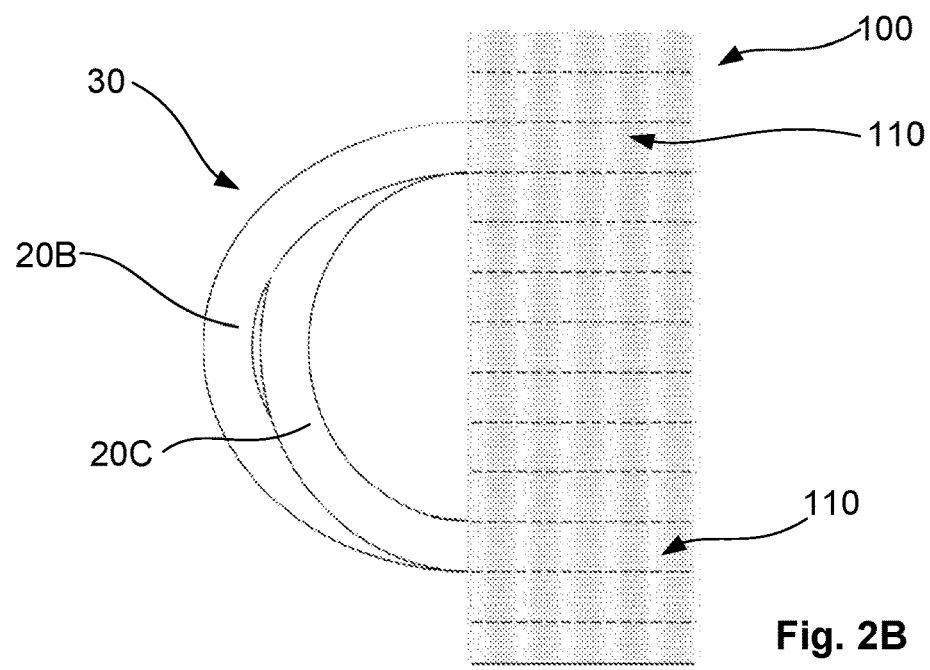

DISTRIBUTED DOUBLE LITZ WIRE WINDING IN OPEN SLOTS

BACKGROUND

The disclosed embodiments relate to electric machines with double-layer distributed winding and more specifically, to electric machines with double-layer distributed winding placed in open slots.

When designing an electric machine, it is desirable to have a slot design, where the electric losses in the conductors are as low as possible and, at the same time, where heat transfer from all the conductors in the slot to the iron core of the stator has some paths with low thermal resistance. These two targets are often in contradiction to each other.

This contradiction is even stronger for the electric machines with open slots operating at frequencies higher than 50 Hz because the high frequency pulsing magnetic field coming through the slot opening create extra losses in the conductors.

To reach low thermal resistance to the heat flow from the slot, especially from the center part of the slot area, the slot-fill factor (SFF) of the winding should be as high as possible. That means having as much of the slot area as possible occupied by copper or other conductive material, and as little area as possible occupied by the insulation. Copper is a good heat conductor while insulation is the poor one.

The conventional way of reaching high SFF is to use solid profiled conductors with rectangular cross section. This allows reaching SFF as high as 80-85%. However, the challenge with solid profiled conductors is the non-uniform current distribution in the individual conductors and in the slot area especially in the case of supplying the machine with elevated frequencies as well as due to pulsing magnetic fields, especially at the slot openings, resulting in higher electric losses than what is typical for low frequencies and in the machines with closed or semi-closed slots. The reasons for the non-uniform current distribution are the well-known skin effect and proximity effect.

To reduce the skin- and proximity effects, two measures are known and are widely applied: reducing cross-sectional area of the conductors, first of all reducing their height, and using transposition of the conductors, the latter meaning the conductors are to change their positions in the slots after passing the end-winding area.

For example, in U.S. Pat. No. 7,759,834 B2 solid profiled conductors are used, where the conductors have low height and their positions get changed after passing the end-winding area as shown in FIG. 1A for a tooth coil. This solution can provide high SFF values, however, at the same time it will be expensive to produce since several different lengths of the conductors will have to be available for each machine design and, moreover, the solid conductors will have to be bent, which is not easy in practice.

Very often, the need for transposition results in twisting or turning the conductors in the end-winding area, which is realized in so-called hairpin windings or diamond windings. Examples can be found in US2014015348 A1 and U.S. Pat. No. 6,894,417 B2. The solution from the latter is reproduced in FIG. 1B. This method will result in longer end-windings, resulting in higher losses and increased length of the machine. In addition, twisting the conductor negatively impacts its insulation increasing probability of the electric break down.

Another known solution is the use of the stranded wires as for example in U.S. Pat. No. 8,946,965 B2. The solution is reproduced in FIG. 1C. However, this requires turning the conductor strand in the end winding area, which complicates the manufacturing.

One more known solution to the problem is the use of Roebel bars. In WO2009000837 A2 individual coil sides comprise a plurality of strands that are transposed in relation to each other such that the coil sides define Roebel bars (FIG. 1D). The strands are transposed 180 degrees in each slot length. The coils are so-called diamond shaped coils. This solution helps reducing electric losses, however, Roebel bars are expensive to produce and do not provide high SFF.

To reduce electric losses due to skin- and proximity effects, litz wire can be used. Litz wire is known in the area of electric machines for many years but its application has been reserved for high-end applications characterized by very high frequencies. SFF that can be achieved with litz wire can reach 60-65%, which, together with relatively high price, has always been pointed at as the disadvantage of this type of conductors and limited its application to the above-mentioned areas.

To summarize the above, it is known that transposition is desirable in most types of windings and it is the common practice to use hairpin (turned or twisted) end windings to realize transposition. It is also the common practice to use stranded wires and solid shaped conductors in distributed windings.

Still there is the need for better machine designs, especially for the machines made for operation at elevated frequencies. The improvements should result in better manufacturability, higher efficiency and higher reliability.

The better manufacturability can be achieved by the use of open slots as for the machines with semi-closed slots it takes many hours to complete the insertion of the winding into the stator.

Higher efficiency can be achieved by reducing the electric losses due to skin- and proximity effects.

Higher reliability can be achieved by avoiding turning and twisting the conductors reducing the impact on conductor insulation and the risk of break down.

SUMMARY

The disclosure provides an electric machine partly or entirely solving the mentioned drawbacks and lacks of prior art solutions.

Also provided is an electric machine improving the manufacturability by reducing the time for insertion of windings into the stator.

Also provided is an electric machine with increased efficiency by reduced electric losses.

Also provided is an electric machine with higher reliability by avoiding turning and twisting of conductors reducing the impact on conductor insulation and the risk of break down.

The inventive embodiments are related to improvement of an electric machine and especially related to improvements of arrangement of windings in a stator for the electric machine.

The embodiments are based on utilizing the inherent features/properties of litz wires. Firstly, the winding design make use of intrinsic transposition of thin strands within the litz wire and thus avoiding the need to twist the strands in the end-winding area. Secondly, the mechanical flexibility of litz wire allows making the end-windings short and compact without compromising reliability.

While designing electric machines using profiled solid conductors the designers aim at high SFF (slot-fill factor) to have smaller slots. However, relatively higher losses due to skin- and proximity effects limit the extent of how much the slot area can be reduced as the efficient heat removal requires larger slot perimeter.

In the disclosed embodiments, a lower SFF is accepted, due to that better current distribution in the slot and lower electric losses thus making heat removal easier by applying litz wires. This alternative approach results in size of the slots comparable to the conventional designs.

Accordingly, the coils are made of profiled litz wire and are formed before placing in open slots of the stator. The coils belonging to different phases form the overlapping structure like in conventional distributed windings by that coil sides of respective coils are positioned one above another along the slot height.

The result of this is compact and short end-windings. Additional benefit is higher reliability thanks to no twisting of the conductors. It is also easy to put phase-to-phase insulation between the end-windings preventing phase-to-phase short circuit.

Litz wire is not much more expensive than for example bent solid conductors made in different lengths or compared to Roebel bars, so the electric machine, having higher efficiency due to the reduced losses, will not have too high cost.

The stator is accordingly provided with a plurality of slots extending in transversal direction of the stator wherein the slots are open and in which slots the coils. The coils comprise first and second coil sides consisting of several conductors of litz wire, as mentioned above, positioned in-line one after another along the slot height, wherein end-winding areas are connecting the first and second coil sides outside the slots.

The number of conductors in the coil sides can be any—from two and up.

The first and second coil sides of respective coils are arranged in separate non-adjacent slots, wherein the first coil side of the respective coil is arranged in one of the slots closer to a bottom of the slot and the second coil side of the respective coil is arranged in the non-adjacent slot closer to an opening of the slot.

Some or all of the conductors are transposed at an end-winding area of the respective coil changing their vertical positions in the coil sides. The end-winding portions of the litz wire conductors are not twisted or turned around the axis of the conductor. Depending on the number of conductors there will be different possible arrangements of the conductors in the first and second coils sides, that will be elaborated in the following example description.

As mentioned above, when two coil sides of two different coils from two different phases fall in the same slot, the coil sides are positioned one above another along the slot height, forming a double layer structure.

According to a disclosed embodiment the conductors are pre-shaped to have substantially square or rectangular form.

In a further embodiment the openings of the open slots are covered with magnetic, semi-magnetic or non-magnetic slot wedges.

BRIEF DESCRIPTION OF THE DRAWINGS

The present invention will below be described in further detail with references to the drawings, where:

FIGS. 2A-2D show transposition of turns of the same coil in the slots,

DETAILED DESCRIPTION

Reference is first made to FIGS. 1A-1D that presents the four prior art winding designs which the disclosed embodiments improve upon, as discussed above.

Reference is now made to FIGS. 2A-2D showing principle drawings of the principle of the winding design for a stator for an electric machine. The stator is formed by a stator armature 100 provided with a plurality of open slots 110 extending in transversal direction of the stator armature 100, e.g. an iron core or similar, wherein the open slots 110 exhibit a bottom 111 at one end and an opening 112 at the other end.

Figure 1A:
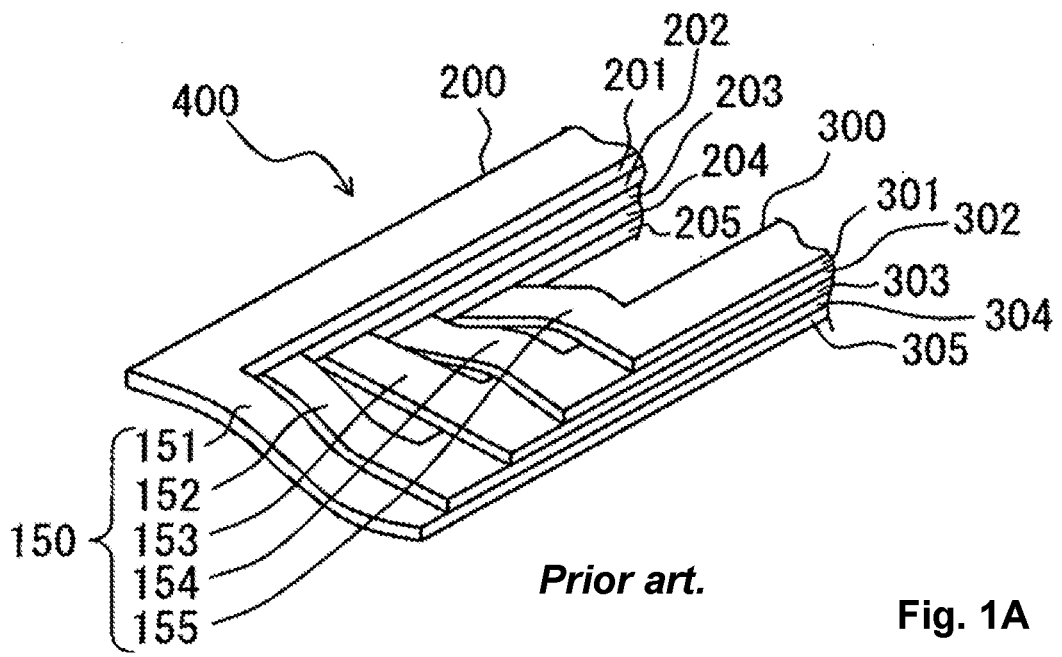
FIGS. 1A-1D show prior art winding designs.
Figure 1B:
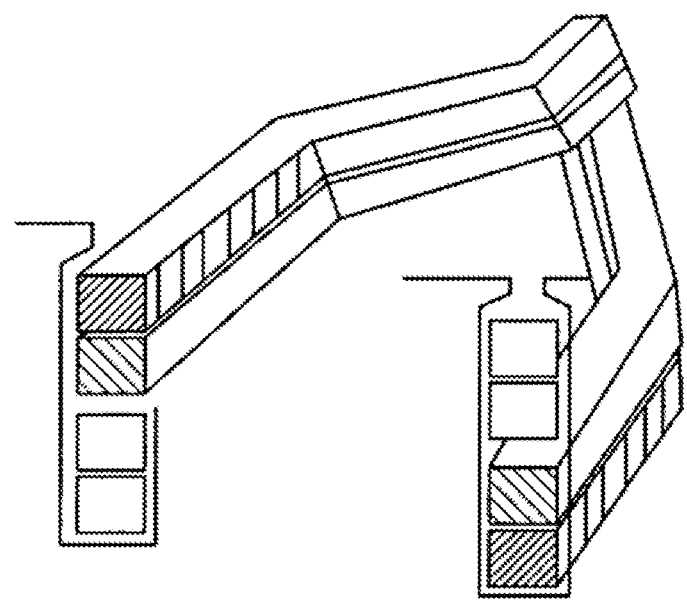
Figure 1C:
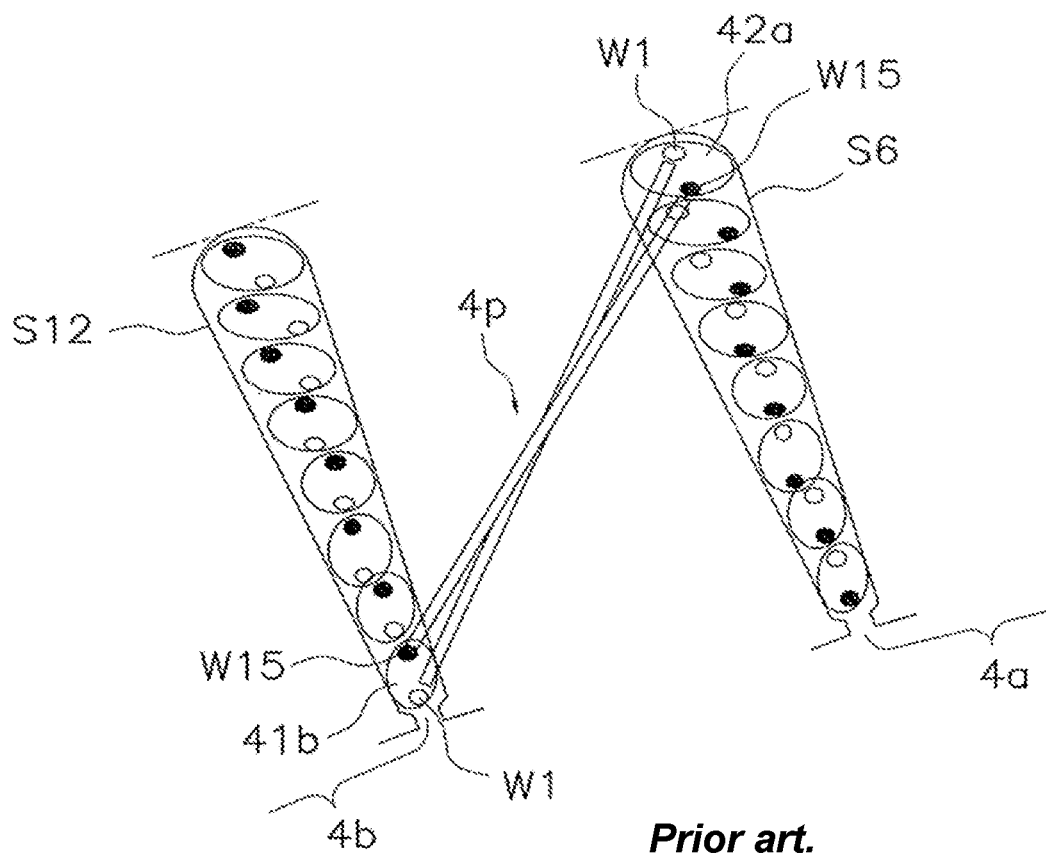
Figure 1D:
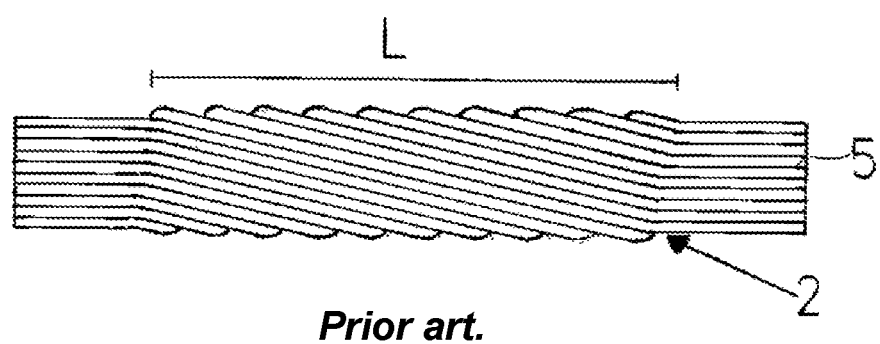
Figure 2C:
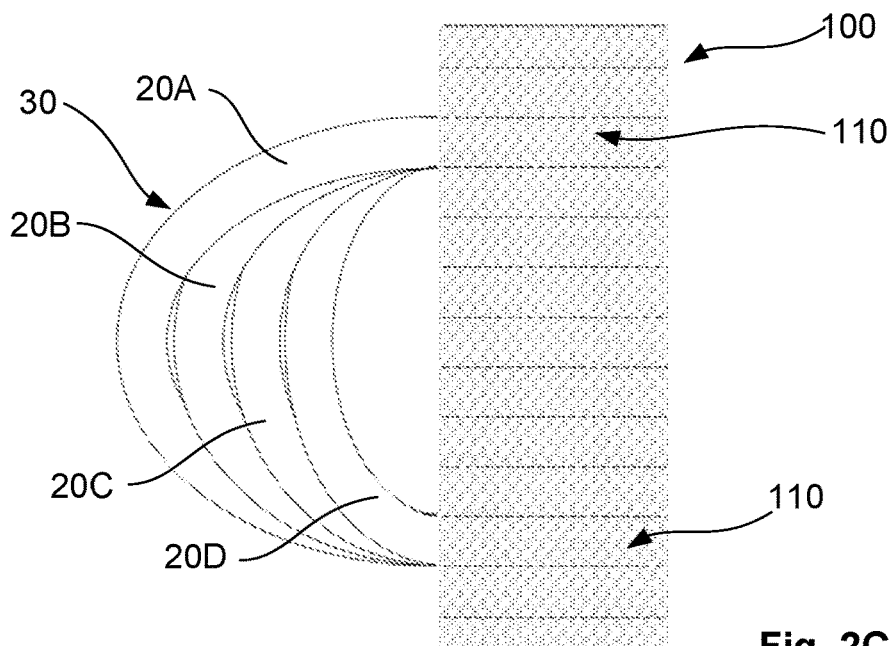

In FIG. 2A is shown an embodiment where a coil 10, as shown in detail in FIGS. 4A-4D, comprising first 11 and second 12 coil sides arranged in separate non-adjacent open slots 110 of the stator armature 100. The first 11 and second 12 coil side, respectively, consists of several conductors 20A-D positioned in-line one after another along the slot 110 height, wherein end-winding areas 30 (see FIGS. 2B and 2C) are connecting the first 11 and second 12 coil sides outside the slots 110. The conductors 20A-D are litz wire conductors. According to an embodiment the litz wire conductors are pre-shaped to have substantially square or rectangular form, wherein the width corresponds to the width of the open slots 110.

When passing the end-winding area 30 (as shown in FIGS. 2B and 2C) some or all of the conductors 20A-D are transposed along the slot 110 height to change their positions in the first 11 and second 12 coil sides. In FIG. 2B it is shown how the conductors 20B and 20C change places in the first 11 and second 12 coil sides:

the conductor 20C which is second closest to the slot opening 112 in the first coil side 11 is transposed in the end-winding area 30 to be the second closest to the slot bottom 111 in the second coil side 12, the conductor 20B which is second closest to the slot bottom 111 in the first coil side 11 is transposed in the end-winding area 30 to be the second closest to the slot opening 112 in the second coil side 12.

FIG. 2B shows how transposition of the two conductors 20B and 20C looks like in the end-winding area 30, while FIG. 2C shows how transposition of all the conductors 20A-D looks like in the end-winding area 30.

Figure 2D:
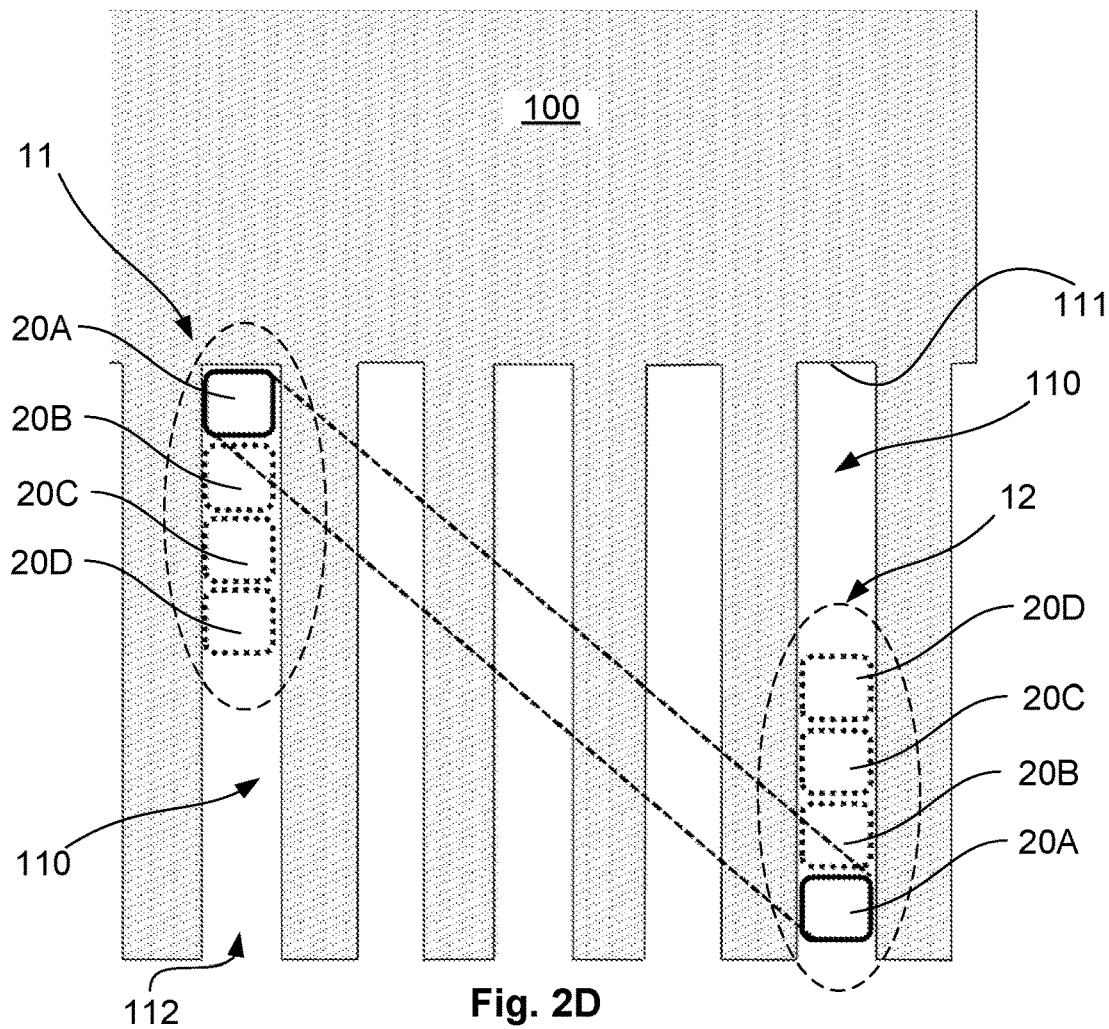

Reference is now made to FIG. 2D showing how conductor 20A is transposed. The conductor 20A which is closest to the slot bottom 111 in the first coil side 11 is transposed along the coil height in the end-winding area 30 to be closest to the slot opening 112 in the second coil side 12. This conductor 20A has the longest end-winding part.

Further, in the shown embodiment the conductor 20B, which is second closest to the slot bottom 111 in the first coil side 11 is transposed along the coil height in the end-winding area 30 to be second closest to the slot opening 112 in the second coil side 12, and the conductor 20C, which is second closest to the slot opening 112 in the first coil side 11 is transposed along the coil height in the end-winding area 30 to be second closest to the slot bottom 111 in the second coil side 12.

The conductor 20D, which is closest to the slot opening 112 in the first coil side 11 is transposed along the coil height in the end-winding area 30 to be closest to the slot bottom 111 in the second coil side 12.

Accordingly, the order of the conductors 20A-D have been reversed in the second coil side 12 in relation to the first coil side 11.

None of the conductors 20A-D are twisted or turned around the axis of the conductor 20A-D.

Figure 3A:
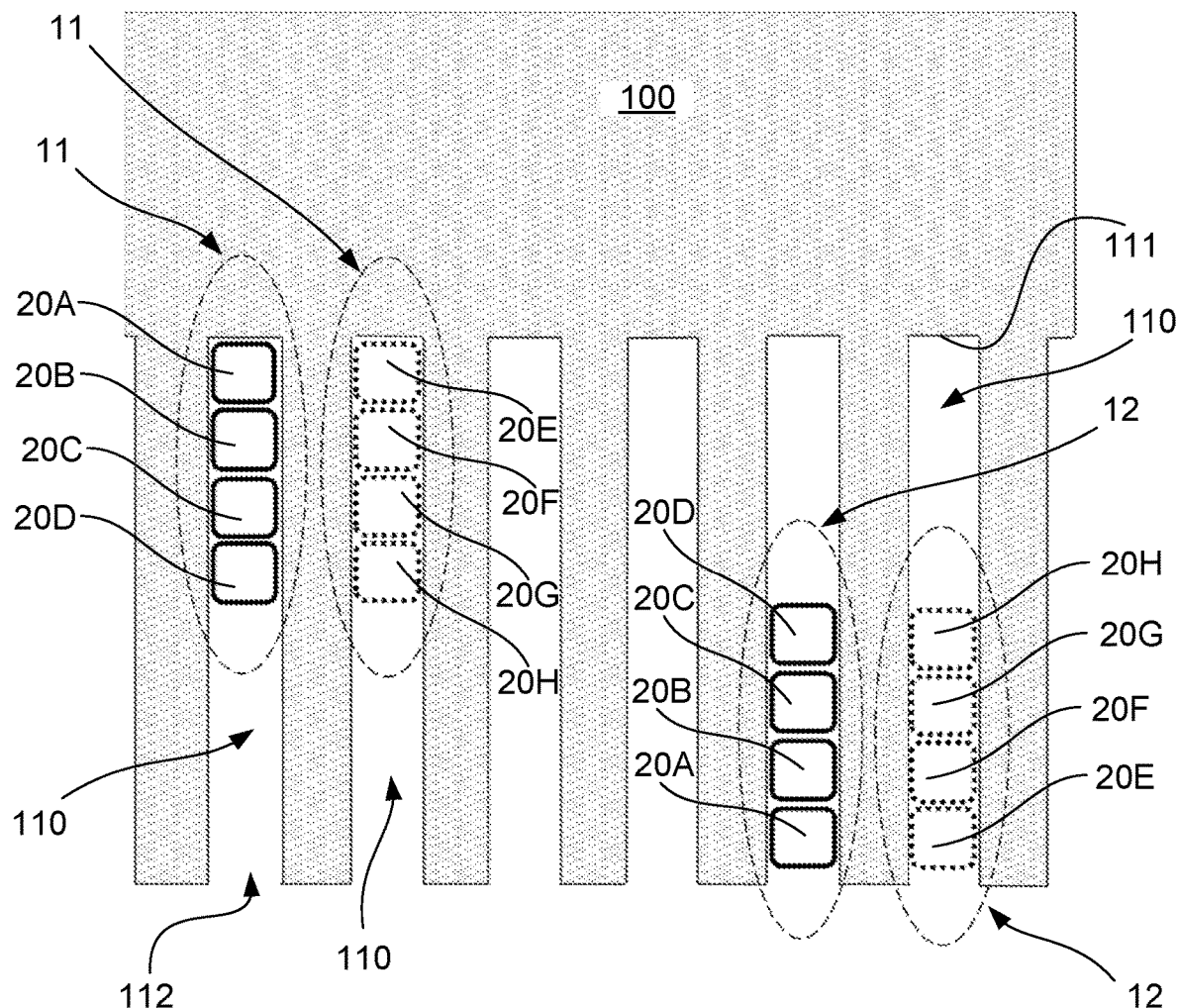
FIGS. 3A and 3B show turns of two coils and the end-windings.

Reference is now made to FIG. 3A where it is shown how two coils (solid lines indicate the conductors 20A-D of a first coil and dotted lines indicate the conductors 20E-H of a second coil) are arranged into the slots 110 one after another. It is shown a first coil having first 11 and second 12 coil sides as described above, and a second coil having first 11 and second 12 coil sides, wherein the first 11 and second 12 coil side, respectively, consists of several conductors 20E-H positioned in-line one after another along the slot 110 height, similar to the first coil.

Figure 3B:
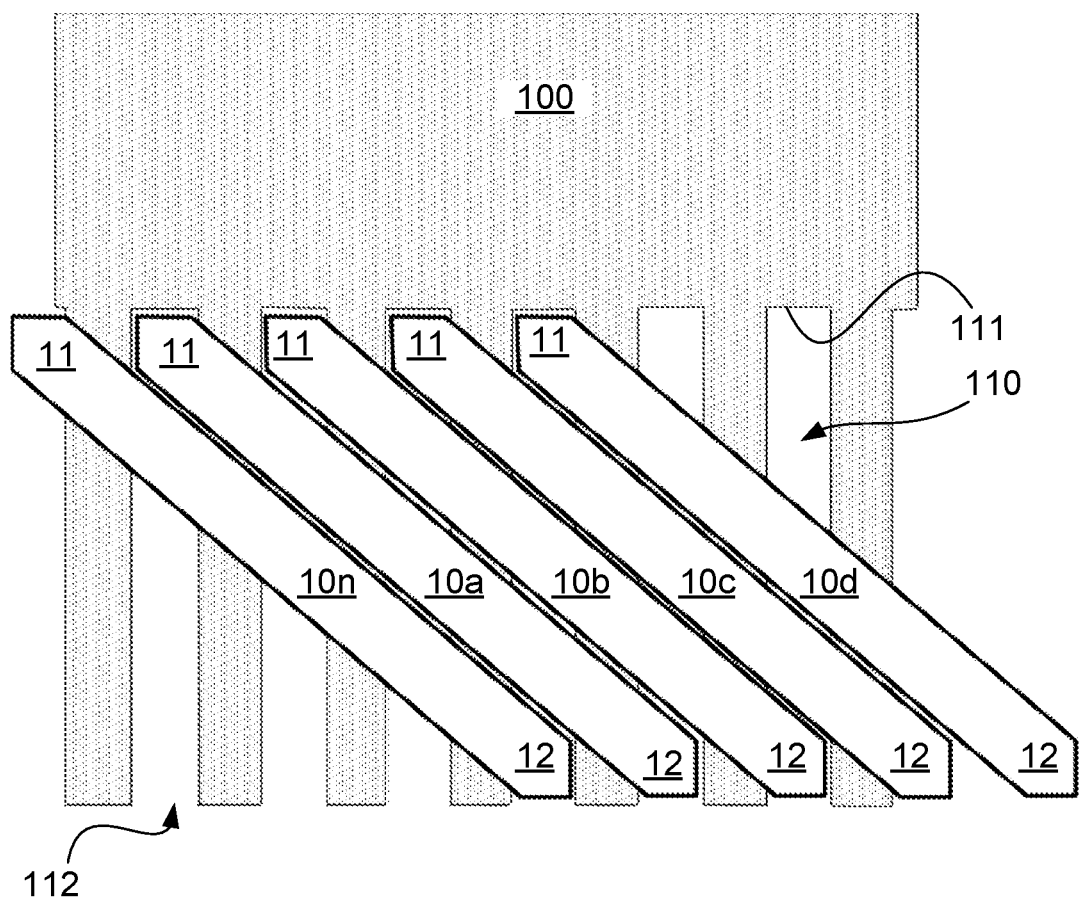

Reference is now made to FIG. 3B. When the first 11 and second 12 coil sides of different coils 10a-n from different phases falls in the same slot 110, the respective first 11 or second 12 coil sides of the different coils 10a-n are positioned one above another along the slot 110 height, forming a double layer structure. In FIG. 3B this situation is shown for coils 10d and 10n, where the first coil side 11 of coil 10d and second coil side 12 of coil 10n fall into the same slot 110, where the coil side 11 is positioned closest to the bottom 111 of the slot 110 and the coil side 12 is positioned closest to the opening 112.

The sequence of connected coils provides a double-layer distributed winding in the stator armature 100. As can be seen from FIG. 3B this results in that the end winding 30 is very compact.

Reference is now made to FIGS. 4A-4D showing details of how the coil 10 can look like.

Figure 4A:
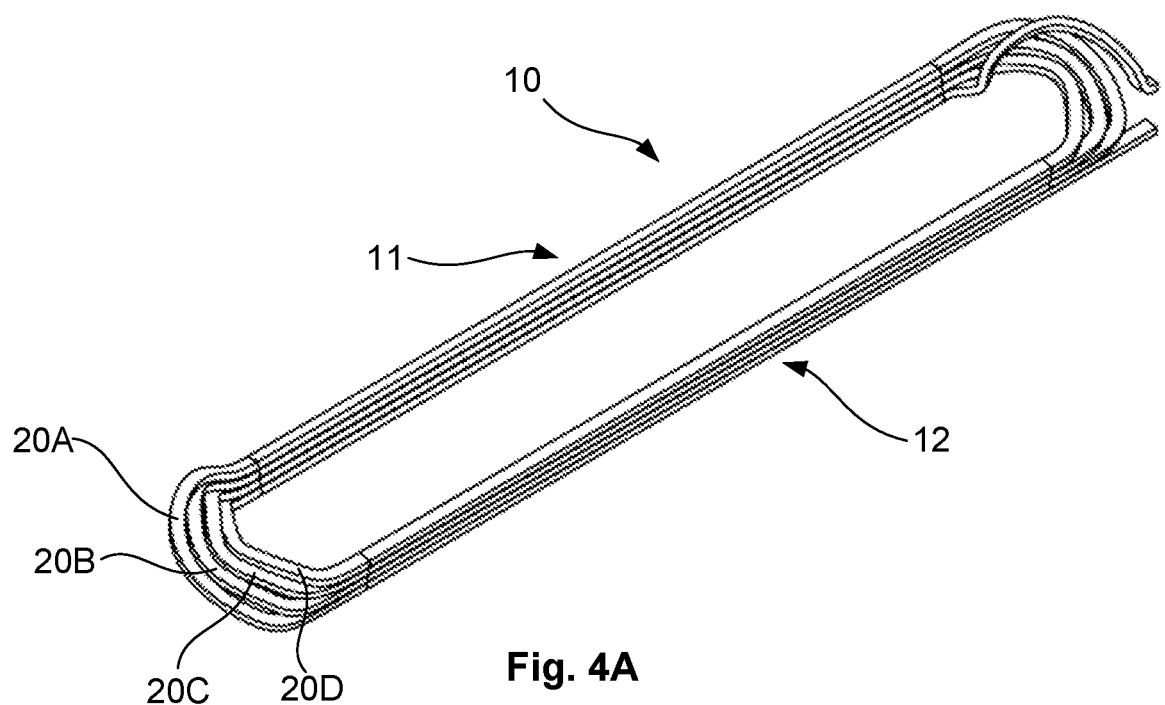
FIGS. 4A-4D show principle drawings of one of the coils.
Figure 4B:
Figure 4C:
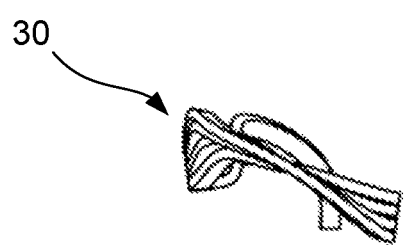
Figure 4D:

In FIG. 4A a 3D view of the coil 10 is shown, FIG. 4B shows the coil 10 from a tangential view, FIG. 4C shows an axial view from an end-winding 30 side, and FIG. 4D shows the coil 10 from a top view.

Figure 5:
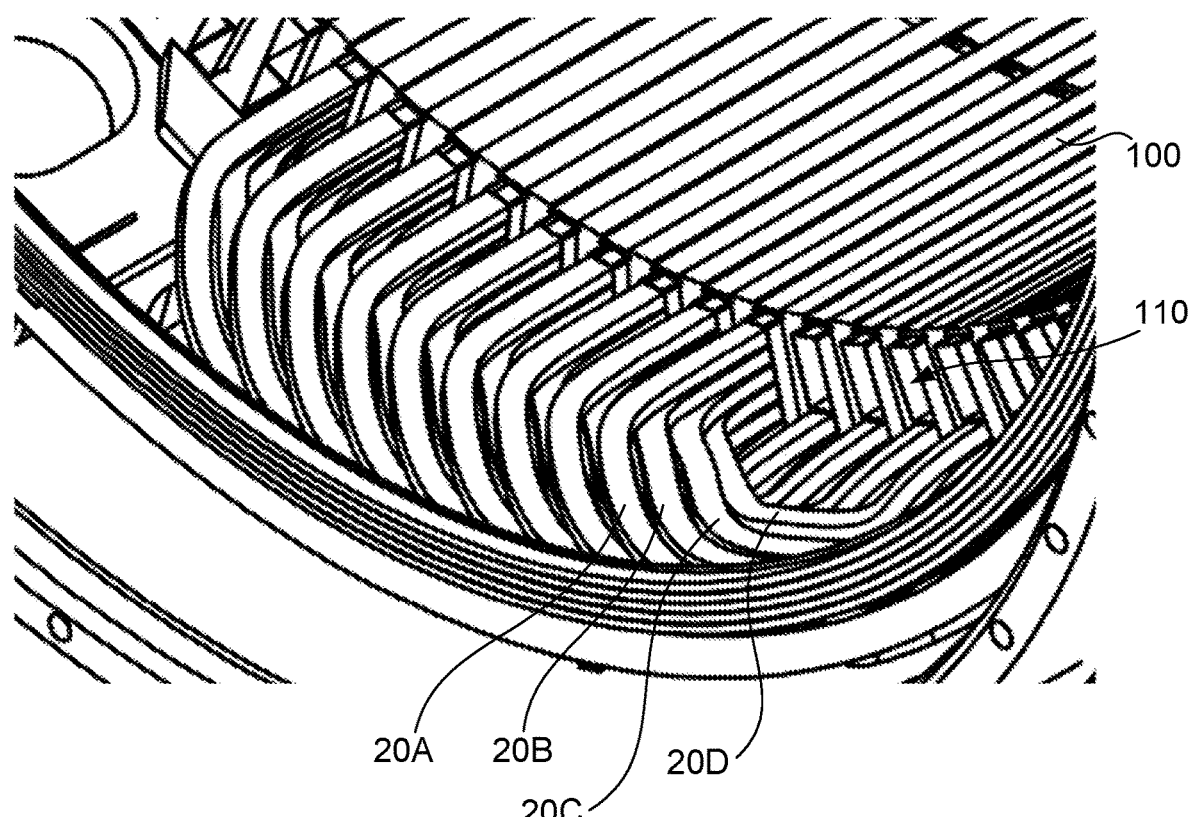
FIG. 5 shows a 3D view of the end-winding insert in the slots of the stator.

Reference is now made to FIG. 5 where a 3D view of the end-winding area 30 is presented, showing the compact structure of the end-winding 30, which is enabled by the flexibility of the end windings made of litz wire. It should be noted that the solution without hairpin end-windings or twisting in the end-winding area 30 can only be realized thanks to the flexibility of the litz wire.

Modifications

This type of winding can be applied in AC machines such as for example synchronous and induction machines.

In some embodiments there can be a wedge covering the opening of the open slots. The wedge can be non-magnetic, semi-magnetic or magnetic.

Number of conductors in the coil side can be any—from two and up. For example when the number of conductors in the coil side is three, the transposition is done as follows:
  a first conductor positioned closest to the slot bottom in the first coil side is transposed along the coil height in the end-winding area to a position closest the slot opening in the second coil side,
  a second conductor positioned closest the slot opening in the first coil side is transposed along the coil height in the end-winding area to a position closest the slot bottom in the second coil side,
  while a third conductor, located between the first and the second conductor is not transposed.

The transposition is done according to the same principle for other numbers of conductors.

NUMERALS

10—coil
10a-n—coil #1 to n
11—first coil side
12—second coil side
20A—conductor #1 in a coil #1
20B—conductor #2 in a coil #1
20C—conductor #3 in a coil #1
20D—conductor #4 in a coil #1
20E—conductor #1 in a coil #2
20F—conductor #2 in a coil #2
20G—conductor #3 in a coil #2
20H—conductor #4 in a coil #2
30—end winding
100—stator armature
110—open slots in stator armature
111—bottom of slot 110
112—opening of slot 110

The invention claimed is:

1. An electric machine, comprising:
a stator formed by a stator armature (100) provided with a plurality of slots (110), each slot having a height and an open end and extending in transversal direction of the stator armature (100),
coils (10, 10a-10n) positioned in said slots (110), each of the coils comprising a first coil side (11) and a second coil side (12),
several conductors (20A-20D, 20E-20H) positioned in-line one after another along the height of the slot (110), each conductor defining an axis,
end-winding areas (30) connecting the first coil side (11) and second coil side (12) outside each slots (110), wherein
the first coil side (11) and second coil side (12) of respective coils (10, 10a-10n) are arranged in separate non-adjacent slots (110),
the first coil side (11) of the respective coil (10, 10a-10n) is positioned in one of the slots (110) closer to a bottom (111) of the slot (110) and the second coil side (12) of the respective coil (10, 10a-10n) is positioned in the non-adjacent slot (110) closer to an opening (112) of the slot (110),
the conductors (20A-D, 20A-H) of respective coils (10, 10a-n) are litz wire conductors,
some or all of the conductors (20A-20D, 20E-20H) are transposed at an end-winding area (30) of the respective coil (10, 10a-10n) changing their vertical positions in the coil sides (11, 12),
the end-winding portions of the conductors (20A-20D, 20E-20H) are not twisted or turned around the axis of the respective conductor (20A-20D, 20E-20H), and the end-winding portions of a conductor (20D, 20H) in the end-winding area (30) is positioned axially closest to an active length section of the coils (10, 10a-10n), and
the end-winding portions of subsequent conductors (20C-20A, 20G-20E) of the respective coils (10, 10a-10n) are positioned next to the end-winding portions of a preceding conductor (20D-20A, 20H-20E), while axially outside and further from the active length section of the coils (10, 10*a*-10*n*) than the preceding conductor (20D-20A, 20H-20E).

2. The electric machine according to claim 1, wherein when coil sides (11, 12) of different coils (10, 10*a*-10*n*) from different phases fall in a common slot (110), the coil sides (11, 12) are positioned one above another along the slot (110) height, forming a double layer structure.

3. The electric machine according to claim 2, wherein the conductors (20A-20D, 20E-20H) are pre-shaped to have a substantially square or rectangular form.

4. The electric machine according to claim 1, wherein the conductors (20A-20D, 20E-20H) are pre-shaped to have a substantially square or rectangular form.

5. The electric machine according to claim 3, wherein openings (112) of the open slots (110) are covered with magnetic, semi-magnetic or non-magnetic slot wedges.

6. The electric machine according to claim 4, wherein openings (112) of the open slots (110) are covered with magnetic, semi-magnetic or non-magnetic slot wedges.

7. The electric machine according to claim 2, wherein openings (112) of the open slots (110) are covered with magnetic, semi-magnetic or non-magnetic slot wedges.

8. The electric machine according to claim 1, wherein openings (112) of the open slots (110) are covered with magnetic, semi-magnetic or non-magnetic slot wedges.

9. The electric machine according to claim 1, wherein the number of conductors (20A-20D, 20E-20H) in the coil sides (11, 12) is four, and
  a first conductor (20A-20D, 20E-20H), which is closest to the slot bottom (111) in the first coil side (11) is transposed along the coil (10, 10*a*-10*n*) height in the end-winding area (30) to be closest to an opening (112) of the slot in the second coil side (12),
  a second conductor (20A-20D, 20E-20H), which is second closest to the slot bottom (111) in the first coil side (11) is transposed along the coil (10, 10*a*-10*n*) height in the end-winding area (30) to be second closest to the slot opening (111) in the second coil side (12),
  a third conductor (20A-20D, 20E-20H), which is second closest to the slot opening (112) in the first coil side (11) is transposed along the coil (10, 10*a*-10*n*) height in the end-winding area (30) to be second closest to the slot bottom (111) in the second coil side (12), and
  a fourth conductor (20A-D, 20E-H), which is closest to the slot opening (112) in the first coil side (11) is transposed along the coil (10, 10*a*-10*n*) height in the end-winding area (30) to be closest to the slot bottom (111) in the second coil side (12).

10. The electric machine according to claim 2, wherein the number of conductors (20A-20D, 20E-20H) in the coil sides (11, 12) is four, and
  a first conductor (20A-20D, 20E-20H), which is closest to the slot bottom (111) in the first coil side (11) is transposed along the coil (10, 10*a*-10*n*) height in the end-winding area (30) to be closest to an opening (112) of the slot in the second coil side (12),
  a second conductor (20A-20D, 20E-20H), which is second closest to the slot bottom (111) in the first coil side (11) is transposed along the coil (10, 10*a*-10*n*) height in the end-winding area (30) to be second closest to the slot opening (111) in the second coil side (12),
  a third conductor (20A-20D, 20E-20H), which is second closest to the slot opening (112) in the first coil side (11) is transposed along the coil (10, 10*a*-10*n*) height in the end-winding area (30) to be second closest to the slot bottom (111) in the second coil side (12), and
  a fourth conductor (20A-D, 20E-H), which is closest to the slot opening (112) in the first coil side (11) is transposed along the coil (10, 10*a*-10*n*) height in the end-winding area (30) to be closest to the slot bottom (111) in the second coil side (12).

11. The electric machine according to claim 3, wherein the number of conductors (20A-20D, 20E-20H) in the coil sides (11, 12) is four, and
  a first conductor (20A-20D, 20E-20H), which is closest to the slot bottom (111) in the first coil side (11) is transposed along the coil (10, 10*a*-10*n*) height in the end-winding area (30) to be closest to an opening (112) of the slot in the second coil side (12),
  a second conductor (20A-20D, 20E-20H), which is second closest to the slot bottom (111) in the first coil side (11) is transposed along the coil (10, 10*a*-10*n*) height in the end-winding area (30) to be second closest to the slot opening (111) in the second coil side (12),
  a third conductor (20A-20D, 20E-20H), which is second closest to the slot opening (112) in the first coil side (11) is transposed along the coil (10, 10*a*-10*n*) height in the end-winding area (30) to be second closest to the slot bottom (111) in the second coil side (12), and
  a fourth conductor (20A-D, 20E-H), which is closest to the slot opening (112) in the first coil side (11) is transposed along the coil (10, 10*a*-10*n*) height in the end-winding area (30) to be closest to the slot bottom (111) in the second coil side (12).

12. The electric machine according to claim 5, wherein the number of conductors (20A-20D, 20E-20H) in the coil sides (11, 12) is four, and
  a first conductor (20A-20D, 20E-20H), which is closest to the slot bottom (111) in the first coil side (11) is transposed along the coil (10, 10*a*-10*n*) height in the end-winding area (30) to be closest to an opening (112) of the slot in the second coil side (12),
  a second conductor (20A-20D, 20E-20H), which is second closest to the slot bottom (111) in the first coil side (11) is transposed along the coil (10, 10*a*-10*n*) height in the end-winding area (30) to be second closest to the slot opening (111) in the second coil side (12),
  a third conductor (20A-20D, 20E-20H), which is second closest to the slot opening (112) in the first coil side (11) is transposed along the coil (10, 10*a*-10*n*) height in the end-winding area (30) to be second closest to the slot bottom (111) in the second coil side (12), and
  a fourth conductor (20A-D, 20E-H), which is closest to the slot opening (112) in the first coil side (11) is transposed along the coil (10, 10*a*-10*n*) height in the end-winding area (30) to be closest to the slot bottom (111) in the second coil side (12).

13. The electric machine according to claim 1, wherein the number of conductors (20A-20D, 20E-20H) in the coil sides (11, 12) is three, and
  a first conductor (20A-20D, 20E-20H) positioned closest to the slot bottom (111) in the first coil side (11) is transposed along the coil (10, 10*a*-10*n*) height in the end-winding area (30) to a position closest an opening of the slot (112) in the second coil side (12),
  a second conductor (20A-20D, 20E-20H) positioned closest the slot opening (112) in the first coil side (11) is transposed along the coil (10, 10*a*-10*n*) height in the end-winding area (30) to a position closest the slot bottom (111) in the second coil side (12),
  while a third conductor (20A-D, 20E-H), located between the first and the second conductor (20A-D, 20E-H) is not transposed.

14. The electric machine according to claim 2, wherein the number of conductors (20A-20D, 20E-20H) in the coil sides (11, 12) is three, and
- a first conductor (20A-20D, 20E-20H) positioned closest to the slot bottom (111) in the first coil side (11) is transposed along the coil (10, 10a-10n) height in the end-winding area (30) to a position closest an opening of the slot (112) in the second coil side (12),
- a second conductor (20A-20D, 20E-20H) positioned closest the slot opening (112) in the first coil side (11) is transposed along the coil (10, 10a-10n) height in the end-winding area (30) to a position closest the slot bottom (111) in the second coil side (12),
- while a third conductor (20A-D, 20E-H), located between the first and the second conductor (20A-D, 20E-H) is not transposed.

15. The electric machine according to claim 3, wherein the number of conductors (20A-20D, 20E-20H) in the coil sides (11, 12) is three, and
- a first conductor (20A-20D, 20E-20H) positioned closest to the slot bottom (111) in the first coil side (11) is transposed along the coil (10, 10a-10n) height in the end-winding area (30) to a position closest an opening of the slot (112) in the second coil side (12),
- a second conductor (20A-20D, 20E-20H) positioned closest the slot opening (112) in the first coil side (11) is transposed along the coil (10, 10a-10n) height in the end-winding area (30) to a position closest the slot bottom (111) in the second coil side (12),
- while a third conductor (20A-D, 20E-H), located between the first and the second conductor (20A-D, 20E-H) is not transposed.

16. The electric machine according to claim 5, wherein the number of conductors (20A-20D, 20E-20H) in the coil sides (11, 12) is three, and
- a first conductor (20A-20D, 20E-20H) positioned closest to the slot bottom (111) in the first coil side (11) is transposed along the coil (10, 10a-10n) height in the end-winding area (30) to a position closest an opening of the slot (112) in the second coil side (12),
- a second conductor (20A-20D, 20E-20H) positioned closest the slot opening (112) in the first coil side (11) is transposed along the coil (10, 10a-10n) height in the end-winding area (30) to a position closest the slot bottom (111) in the second coil side (12),
- while a third conductor (20A-D, 20E-H), located between the first and the second conductor (20A-D, 20E-H) is not transposed.

* * * * *